United States Patent
Engin et al.

(10) Patent No.: US 9,893,920 B2
(45) Date of Patent: Feb. 13, 2018

(54) SIGNAL PROCESSING CIRCUITS

(71) Applicant: NXP B.V.

(72) Inventors: Nur Engin, Eindhoven (NL); Audrey Christine Andrée Cuenin, Eindhoven (NL)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 15/443,982

(22) Filed: Feb. 27, 2017

(65) Prior Publication Data

US 2017/0288927 A1    Oct. 5, 2017

(30) Foreign Application Priority Data

Apr. 1, 2016    (EP) ..................................... 16163580

(51) Int. Cl.
| | |
|---|---|
| *H04B 3/46* | (2015.01) |
| *H04L 27/26* | (2006.01) |
| *H04L 5/00* | (2006.01) |
| *H04L 25/49* | (2006.01) |

(52) U.S. Cl.
CPC ........ *H04L 27/2623* (2013.01); *H04L 5/0064* (2013.01); *H04L 25/49* (2013.01); *H04L 27/2601* (2013.01)

(58) Field of Classification Search
CPC .............. H04L 27/2624; H04L 27/2623; H04L 27/2633; H04L 27/263; H04L 27/2604; H04L 27/3411; H04L 27/2618
See application file for complete search history.

(56) References Cited

U.S. PATENT DOCUMENTS

| | | | | |
|---|---|---|---|---|
| 7,583,738 | B2* | 9/2009 | Yun | ...................... H04L 27/2618 370/206 |
| 9,363,123 | B2* | 6/2016 | Lo | ........................ H04L 27/2624 |
| 9,374,256 | B2* | 6/2016 | Lozhkin | .............. H04L 27/2623 |
| 2005/0089109 | A1* | 4/2005 | Yun | ...................... H04L 27/2618 375/260 |
| 2007/0089015 | A1* | 4/2007 | Saul | .................... H04L 27/2604 714/746 |
| 2009/0323857 | A1* | 12/2009 | Singh | .................. H04L 27/2624 375/297 |

(Continued)

FOREIGN PATENT DOCUMENTS

WO    03/075457 A1    9/2003

OTHER PUBLICATIONS

Rahmatallah, Y. et al. "Peak-To-Average Power Ratio Reduction in OFDM Systems: A Survey and Taxonomy", IEEE Communications Surveys & Tutorials, vol. 15, No. 4, pp. 1567-1592 (2013).

(Continued)

*Primary Examiner* — Khanh C Tran
(74) *Attorney, Agent, or Firm* — Rajeev Madnawat

(57) ABSTRACT

A signal processing circuit comprising a clip-generation-block. The clip-generation-block is configured to receive an input-signal; and determine a clip-signal that comprises only values of the input-signal that exceed a clipping-threshold. The signal processing circuit also comprises a scaling-block configured to apply a scaling-factor to the clip-signal in order to generate a scaled-clip-signal, wherein the scaling-factor is greater than one; and an adder configured to provide a clipped-signal based on a difference between the scaled-clip-signal and the input signal.

15 Claims, 5 Drawing Sheets

(56) References Cited

U.S. PATENT DOCUMENTS

| | | | | |
|---|---|---|---|---|
| 2010/0316164 A1* | 12/2010 | Liang | ............... | H03F 1/3241 |
| | | | | 375/298 |
| 2011/0092173 A1* | 4/2011 | McCallister | ......... | H03F 1/3247 |
| | | | | 455/108 |
| 2011/0116535 A1* | 5/2011 | Mori | ............... | H04L 27/361 |
| | | | | 375/224 |
| 2011/0228872 A1* | 9/2011 | Soler Garrido | ..... | H04L 27/2623 |
| | | | | 375/295 |
| 2014/0161202 A1* | 6/2014 | Gunturi | ............ | H04L 27/2623 |
| | | | | 375/267 |
| 2016/0191110 A1* | 6/2016 | Brecher | ............ | H04L 27/3411 |
| | | | | 375/295 |

OTHER PUBLICATIONS

Jiang, T. et al. "An Overview: Peak-to-Average Power Ratio Reduction Techniques for OFDM Signals", IEEE Transactions on Broadcasting, vol. 54, No. 2, pp. 257-268 (Jun. 2008).

Han, H. et al. "An Overview of Peak-to-Average Power Ratio Reduction Techniques for Multicarrier Transmission", IEEE Wireless Communications, vol. 12, No. 2, pp. 56-65 (Apr. 2005).

Armstrong, J. "New OFDM Peak-to-Average Power Reduction", IEEE Vehicular Technology Conference, vol. 1, pp. 756-760 (May 2001).

\* cited by examiner

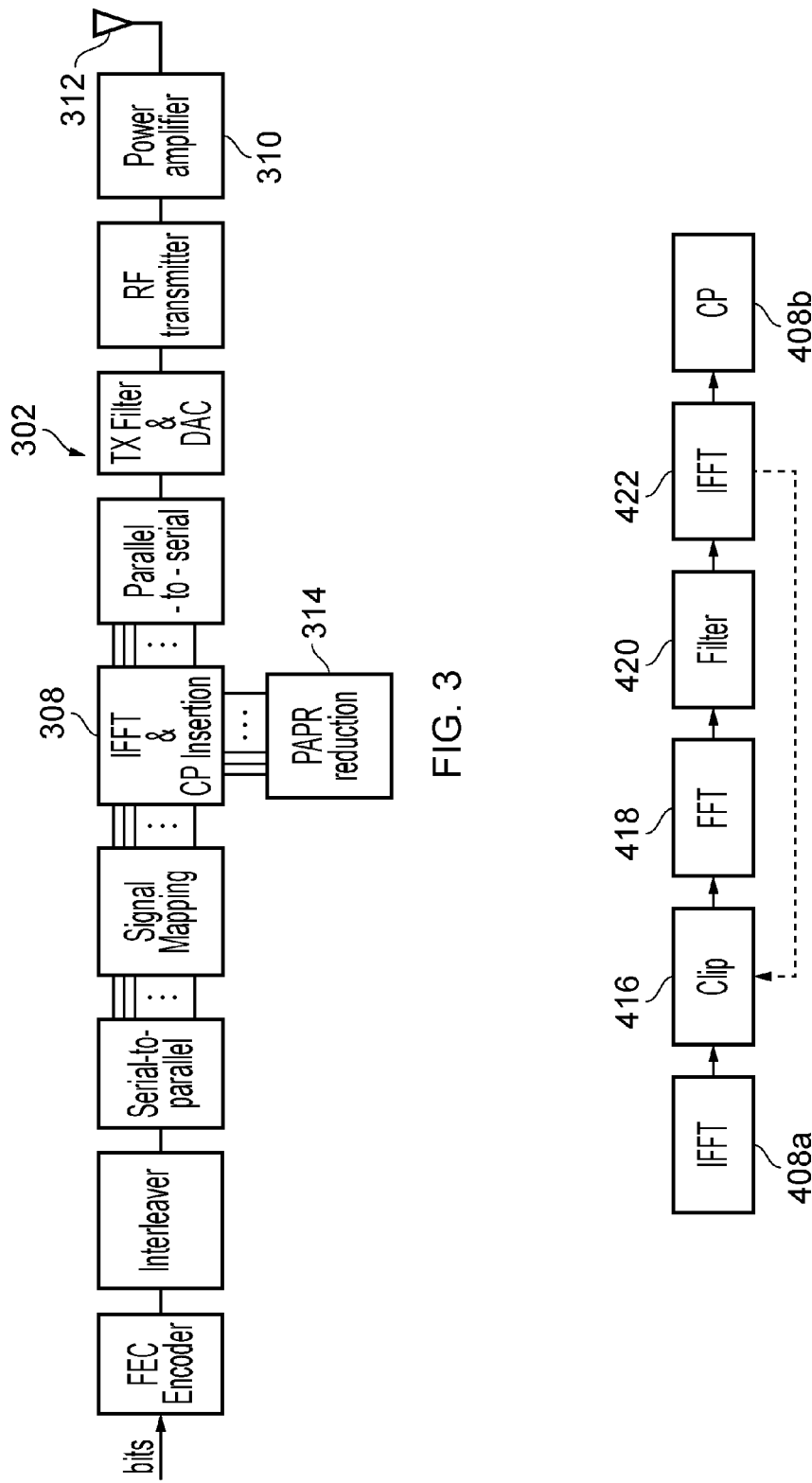

SIGNAL PROCESSING CIRCUITS

CROSS-REFERENCE TO RELATED APPLICATIONS

This application claims the priority under 35 U.S.C. §119 of European Patent application no. 16163580.0, filed on Apr. 1, 2016, the contents of which are incorporated by reference herein.

The present disclosure relates to signal processing circuits, and in particular, although not necessarily, to signal processing circuits for orthogonal frequency division multiplexing (OFDM) transmitters According to a first aspect of the present disclosure there is provided a signal processing circuit comprising:
  a clip-generation-block configured to:
    receive an input-signal; and
    determine a clip-signal that comprises only values of the input-signal that exceed a clipping-threshold;
  a scaling-block configured to apply a scaling-factor to the clip-signal in order to generate a scaled-clip-signal, wherein the scaling-factor is greater than one; and
  an adder configured to provide a clipped-signal based on a difference between the scaled-clip-signal and the input signal.

Such a signal processing circuit can result in lower errors/distortions because a lower clipping-threshold can be used than would be the case if a scaling-factor were not used. Also, for a given level of errors, a reduced PAPR value can be achieved when compared with a circuit that does not include a scaling-block.

In one or more embodiments the scaling-factor comprises a frequency-domain-scaling-factor, which may define a function that varies with frequency. The frequency-domain-scaling-factor may comprise a plurality of randomly generated values, which may be limited to range of values between a maximum-value and a minimum-value. The maximum-value may be greater than one.

The scaling-factor may comprise a time-domain-scaling-factor.

In one or more embodiments the clip-signal comprises: zero values at instants in time for which the input-signal is less than the clipping-threshold; and non-zero values at instants in time for which the input-signal is greater than the clipping-threshold. The non-zero values may comprise the difference between the input-signal and the clipping-threshold.

In one or more embodiments the scaling-block is configured to multiply the clip-signal by the scaling-factor in order to generate the scaled-clip-signal.

In one or more embodiments, the signal processing circuit further comprises a filter. The filter may be configured to attenuate (i) any out-of-band terms in the scaled-clip-signal; and/or (ii) any pilot-subcarriers in the scaled-clip-signal, in order to provide a scaled-filtered-clip-signal. The adder may be configured to provide the clipped-signal based on a difference between the scaled-filtered-clip-signal and the input signal.

In one or more embodiments the signal processing circuit further comprises a feedback-block, which provides a feedback loop to the clip-generation-block and/or the scaling-block. The feedback-block may be configured to:
  determine a PAPR value and/or a distortion-measure of the clipped-signal; and
  selectively provide a feedback-signal to the clip-generation-block and/or the scaling-block based on the PAPR value and/or the distortion-measure.

In one or more embodiments the clip-generation-block is configured to apply an adjusted-clipping-threshold to the input-signal based on the feedback-signal. The scaling-block may be configured to apply an adjusted-scaling-factor to the clip-signal based on the feedback-signal.

In one or more embodiments the feedback-block is configured to cause additional iterations of the feedback loop to occur such that different clipping-thresholds and/or different scaling-factors are applied until:
  the PAPR value of the clipped-signal reaches a target value;
  the distortion-measure of the clipped-signal reaches a target value; or
  a predefined number of iterations of the feedback loop have been performed.

In one or more embodiments the feedback-block is configured to, for a second and each subsequent iteration of the feedback loop, determine one or more of the following:
  the PAPR value of the clipped-signal, which is based on an input-signal clipped with the adjusted-clipping-threshold;
  the distortion-measure of the clipped-signal, which is based on an input-signal clipped with the adjusted-clipping-threshold;
  a preceding-PAPR-value, which is based on an input-signal clipped with a preceding-clipping-threshold in an earlier iteration of the feedback loop; and
  a preceding-distortion-measure, which is based on an input-signal clipped with a preceding-clipping-threshold in an earlier iteration of the feedback loop.

In one or more embodiments the feedback-block is configured to cause additional iterations of the feedback loop to occur such that different dipping-thresholds are applied and/or different scaling-factors are applied are applied until:
  a difference between the PAPR value of the clipped-signal and a preceding-PAPR-value is reduced to a target value; or
  a difference between a current-distortion-measure and a preceding-distortion-measure is reduced to a target value.

Wherein the clip-signal comprises a time-domain signal, and the signal processing circuit further comprises:
  a time-to-frequency-domain-conversion block configured to convert the clip-signal to a frequency-domain-clip-signal;
  and wherein the scaling-factor comprises a frequency-domain-scaling-factor.

Wherein the scaled-clip-signal comprises a frequency-domain signal, and the signal processing circuit further comprises:
  a frequency-to-time-domain-conversion block configured to convert the scaled-clip-signal to a time-domain-scaled-clip-signal, and wherein:
  the adder is configured to provide the clipped-signal based on a difference between the time-domain-scaled-clip-signal and a time domain representation of the input-signal.

Wherein the scaled-clip-signal comprises a frequency-domain signal, and wherein the adder is configured to provide the clipped-signal based on a difference between (i) the scaled-clip-signal and (ii) a frequency-domain representation of the input signal.

There may be provided a method of processing an input-signal, the method comprising:
  determining a clip-signal that comprises only values of the input-signal that exceed a clipping-threshold;

applying a scaling-factor to the clip-signal in order to generate a scaled-clip-signal, wherein the scaling-factor is greater than one; and providing a clipped-signal based on a difference between the scaled-clip-signal and the input signal.

There may be provided an OFDM transmitter comprising any signal processing circuit disclosed herein.

There may be provided an electronic device, which may include an OFDM transmitter, comprising any signal processing circuit disclosed herein.

There may be provided an integrated circuit comprising any signal processing circuit disclosed herein or any OFDM transmitter disclosed herein.

There may be provided a computer program, which when run on a computer, causes the computer to configure any apparatus, including a circuit, transmitter, system or device disclosed herein or perform any method disclosed herein.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

The above discussion is not intended to represent every example embodiment or every implementation within the scope of the current or future Claim sets. The figures and Detailed Description that follow also exemplify various example embodiments. Various example embodiments may be more completely understood in consideration of the following Detailed Description in connection with the accompanying Drawings.

One or more embodiments will now be described by way of example only with reference to the accompanying drawings in which:

FIG. 3 shows an OFDM transmitter circuit;

FIG. 4 shows a block diagram of a clip-and-filter method;

OFDM (Orthogonal Frequency Division Multiplexing) is a digital transmission method that is based on transmitting data bits in orthogonally positioned carriers, as opposed to a single carrier transmission. OFDM can have important benefits such as easy and high performance equalization in case of selective fading channels, spectral efficiency and good overall performance when combined with error correcting codes. As a result of these advantages OFDM has been chosen by many industry standards in wireless communication and networking. Typical examples are LTE and LTE-A standards for cellular communication, 802.11a/g/n/ac standards for wireless local area networks, 802.11p standard for emerging area of vehicular networks, and many video/audio broadcast standards such as DVB, DAB, CMMB, DMB-T, ISDB-T, etc.

Figure 1:
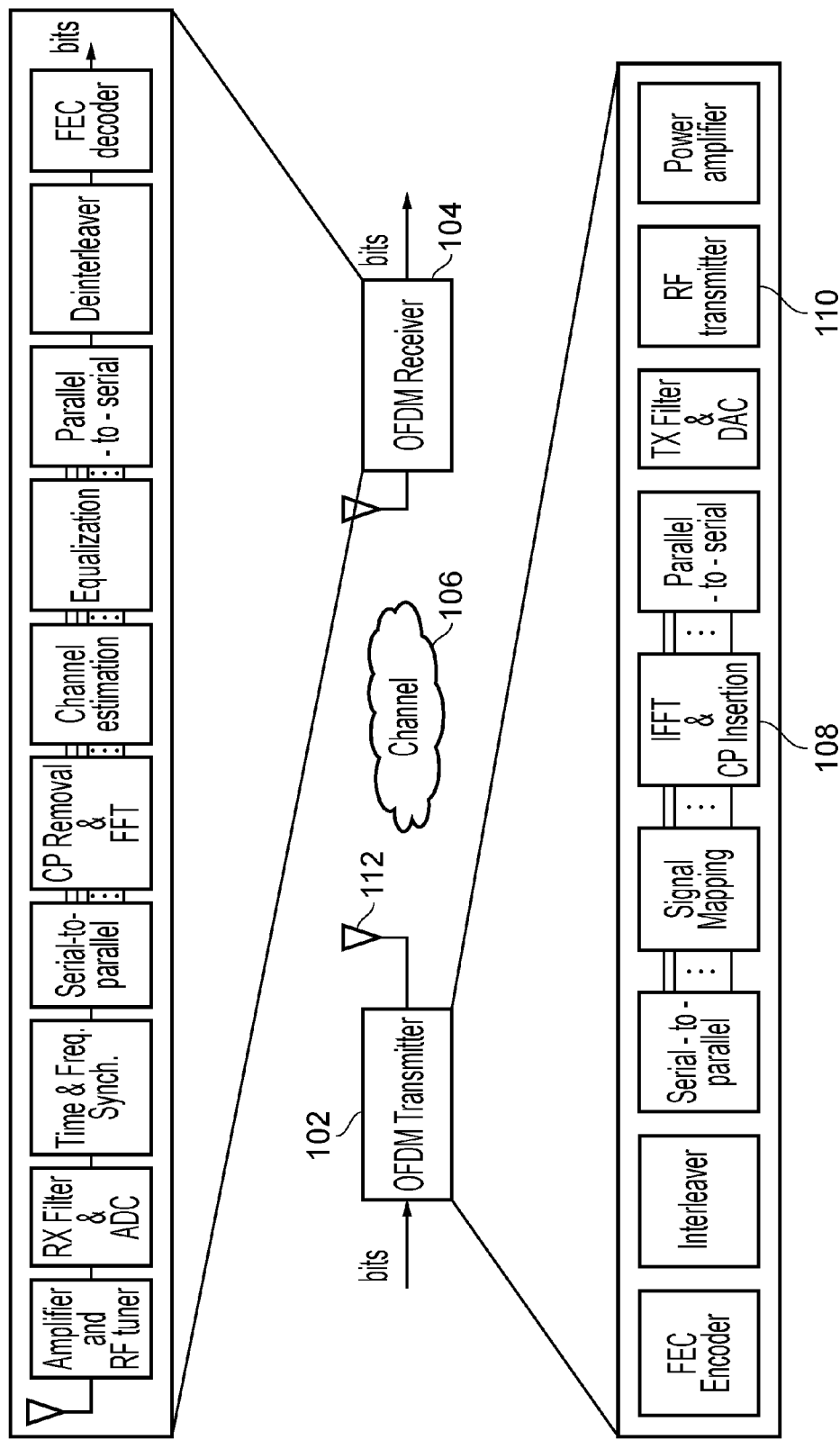
FIG. 1 shows a block diagram of an OFDM transmit and receive system.

FIG. 1 shows a block diagram of an OFDM transmit and receive system. FIG. 1 shows an OFDM transmitter 102, an OFDM receiver 104 and a channel 106. Expanded views of the OFDM transmitter 102 and the OFDM receiver 104 are also shown.

As shown in FIG. 1, the OFDM transmitter 102 includes an IFFT (Inverse Fast Fourier Transform) block 108 that maps received information bits into so-called OFDM sub-carriers. In this way, the original information can be received in the frequency domain, and the transmitted data is in time domain. The OFDM transmitter 102 also includes a transmit-power-amplifier 110 that amplifies the OFDM signal before it is transmitted via a transmit-antenna 112.

The expanded view of the OFDM receiver 104 shows blocks that correspond to the reverse processing of the OFDM transmitter 102, and includes reverse transformations and detection steps such as channel estimation and equalization.

Due to the IFFT in OFDM modulation, the time-domain signal that is transmitted by the OFDM transmitter 102 can have a high peak-to-average power ratio (PAPR). PAPR is defined as the ratio of the power in the largest subcarrier divided by the average power of all subcarriers in dB:

$$PAPR_{dB} = 10\log_{10}\frac{\max|x(t)|^2}{E(x(t)^2)}$$

Theoretically, an OFDM signal generated by an N-point IFFT will have a worst-case PAPR value of $10\log_{10} N$ (based on the case where there is only one peak and the rest of the time-domain subcarrier values are zero), although the PAPR for real signal frames are often much lower.

Figure 2:
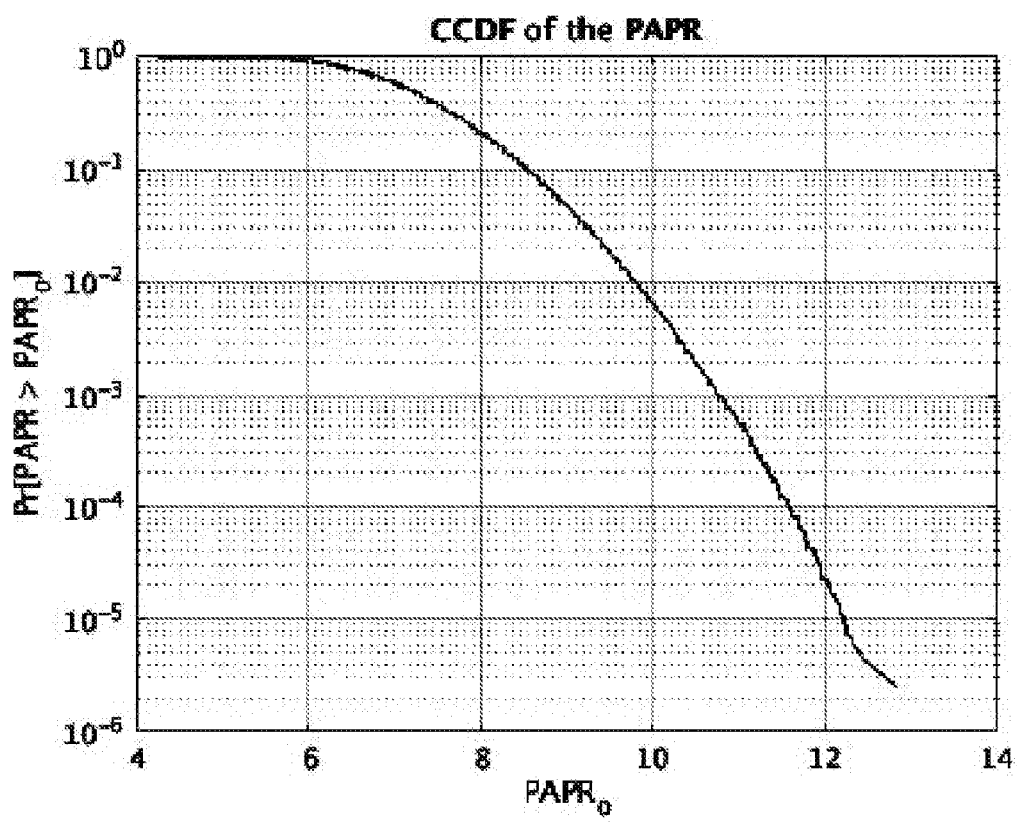
FIG. 2 shows graphically a complementary cumulative distributive function (CCDF) of PAPR values.

FIG. 2 shows graphically a complementary cumulative distributive function (CCDF) of PAPR values for randomly generated frames for a 64-point OFDM signal. A point (x,y) in FIG. 2 denotes that y is the probability that the PAPR value of the signal is below x (dB).

If a high PAPR exists, then it can complicate the design of the OFDM transmitter. This can be because the transmit-power-amplifier may require a large back-off in order to reduce the transmit-power-amplifiers maximum output power level such that the entire OFDM signal is within the linear region of the transmit-power-amplifier PA. This can result in overall decreased efficiency. Furthermore, a digital-to-analogue (D/A) converter in the OFDM transmitter may require higher precision due to the larger dynamic range of values. Therefore, it can be advantageous to design/modify OFDM transmit signals such that the PAPR value is decreased.

FIG. 3 shows an OFDM transmitter circuit. Features of FIG. 3 that have already been described with reference to FIG. 1 have been given corresponding reference numbers in the 300 series.

The circuit of FIG. 3 includes a PAPR-reduction block 314. As will be discussed below, the PAPR-reduction block 314 can modify the OFDM signal such that the peaks of time domain signals are reduced, thereby reducing the PAPR value. This can be achieved by processing the OFDM frame during or after the conversion to the time domain by the IFFT block 308. In this way, the requirements for the transmit-power-amplifier 310 can be relaxed to some extent.

In general, techniques applied by the PAPR-reduction block 314 can be standardized, or can be compliant with already existing standards (backward compliant). In the standardized case, certain provisions can be included in the (proprietary) standards so as to prevent high PAPR OFDM frames from being created, for example by reserving certain subcarriers in a frame for sending values that can be calculated for each OFDM frame such that the PAPR of the resulting time-domain signal is decreased. In this case, the receiver knows about the reserved parts of the frame and can use or discard these reserved parts accordingly. In the backward compliant case, PAPR reduction can be applied to any existing standard by modifying the transmitter design only. In this case the receiver does not know about the added functionality, and therefore the frame structure cannot be changed. The only changes can be made to the sample values in the transmitted signal. These changes should be limited because they represent distortions to the transmitted signal. In particular, the changes should be below a level at which they would significantly impact the quality of reception.

The quality of reception can be represented by one or more distortion-measures. A particularly beneficial example of a distortion-measure is error vector magnitude (EVM). The definition of EVM in the 802.11 standards is depicted below.

The clip-generation-block 416 applies a clipping-threshold/limit (C) to the time-domain-input signal (x[n]) in order to determine a clip-signal $x_c[n]$ as:

$$x_c[n] = \begin{cases} x[n] - Ce^{j\phi_n}, & |x[n]| \geq C \\ 0, & |x[n]| < C \end{cases}$$

where $x[n]=|x[n]|e^{j\phi_n}$,

The clip-generation-block 416 then generates the clipped-signal ($x_{clipped}[n]$) by subtracting the clip-signal ($x_c[n]$) from the time-domain-input-signal (x[n]). In this way, any peaks in the time-domain-input-signal (x[n]) that exceed the clipping-threshold (C) are flattened/limited to the clipping-threshold (C).

After clipping, filtering can be applied either in the time- or frequency-domain to remove or reduce any out-of-band (OOB) terms. This is advantageous because the manipulation of the signal in the time domain by clipping will result in "regrowth" of frequency components that were outside the frequency spectrum of the input-signal before it was clipped.

$$Error_{RMS} = \frac{\sum_{i=1}^{N_f} \sqrt{\frac{\sum_{i=1}^{L_r} \left[ \sum_{k=1}^{52} \{(I(i,j,k) - I_0(i,j,k))^2 + (Q(i,j,k) - Q_0(i,j,k))^2\} \right]}{52 L_p \times P_0}}}{(N_f)} \qquad (18\text{-}28)$$

where
$L_p$ is the length of the packet;
$N_f$ is the number of frames for the measurement;
($I_0(i,j,k)$, $Q_0(i,j,k)$) denotes the ideal symbol point of the $i^{th}$ frame, $j^{th}$ OFDM symbol of the frame, $k^{th}$ subcarrier of the OFDM symbol in the complex plane;
($I(i,j,k)$, $Q(i,j,k)$) denotes the observed point of the $i^{th}$ frame, $j^{th}$ OFDM symbol of the frame, $k^{th}$ subcarrier of the OFDM symbol in the complex plane (see FIG. 18-16);
$P_0$ is the average power of the constellation.

As shown, the EVM is defined in the root-mean-square (RMS) form over a burst of symbols.

Different distortion-measures can also be used. For example, bit/frame error rate at the receiver (which can be linked to EVM), or expansion of bandwidth. However in some examples the expansion of bandwidth can be reduced/prevented by filtering.

FIG. 4 shows a block diagram of a signal processing circuit that can perform clip-and-filter method that can be performed by the IFFT block and PAPR-reduction block of FIG. 3. The clip-and-filter method is an example of a standard compliant case in which the time-domain OFDM signal is intentionally pre-distorted in order to decrease peaks that occur above a certain threshold. As will be discussed below, the highest peaks in the time-domain OFDM signal are clipped and then the clipped-signal is low-pass filtered to obtain a transmit OFDM signal with a lower PAPR.

FIG. 4 shows an IFFT block 408a, which converts a received frequency-domain-input signal (X(f)) into a time-domain-input signal (x[n]). A dip-generation-block 416 then provides as an output a clipped-signal ($x_{clipped}[n]$).

In the example of FIG. 4, filtering is performed in the frequency domain as follows. A FFT-block 418 converts the clipped-signal ($x_{clipped}[n]$) into a frequency-domain-clipped-signal ($X_{clipped}(f)$). This instance of an FFT-block 418 may be referred to as a clipped-FFT-block, and it can have the same functionality as other FFT blocks described herein. A filter 420 then filters the frequency-domain-clipped-signal ($X_{clipped}(f)$) in order to provide a frequency-domain-clipped-filtered-signal ($X_{clipped,filtered}(f)$). An IFFT block 422 then converts the frequency-domain-clipped-filtered-signal ($X_{clipped,filtered}(f)$) back to the time domain as a clipped-filtered-signal ($x_{clipped,filtered}[n]$). This instance of an IFFT-block 422 may be referred to as a clipped-IFFT-block, and it can have the same functionality as other IFFT blocks described herein.

A cyclic prefix (CP) can then be added to the clipped-filtered-signal ($x_{clipped,filtered}[n]$) in the same as way as in standard OFDM. The circuit of FIG. 4 therefore outputs a low PAPR OFDM signal for transmission.

The processing of FIG. 4 can also be performed in an iterative fashion, as shown by the dotted line in FIG. 4. In this way, the level of the clipping-threshold (C) that is applied by the clip-generation-block 416 can be changed for each subsequent iteration in order to further improve the PAPR value of the clipped-filtered-signal ($x_{clipped,filtered}[n]$). For example, the clipping-threshold (C) can be reduced, and the PAPR value of the clipped-filtered-signal recalculated, until additional iterations do not result a significant improvement in the PAPR value.

In general, the applicability of the clip-and-filter method described with reference to FIG. 4 can be limited because the distortion it introduces has to be kept low enough such that the system still remains compliant with standard-imposed limitations such as EVM (error vector magnitude) and power masks. For this reason, the clipping-threshold (C) may need to be kept relatively high and therefore the peaks in the input-signal are not reduced by much. Because of this, the level of PAPR reduction achieved by the clipping and filtering of FIG. 4 can be relatively limited.

The FFT-blocks disclosed herein are examples of time-to-frequency-domain-conversion blocks. The IFFT-blocks disclosed herein are examples of frequency-to-time-domain-conversion blocks.

Figure 5:
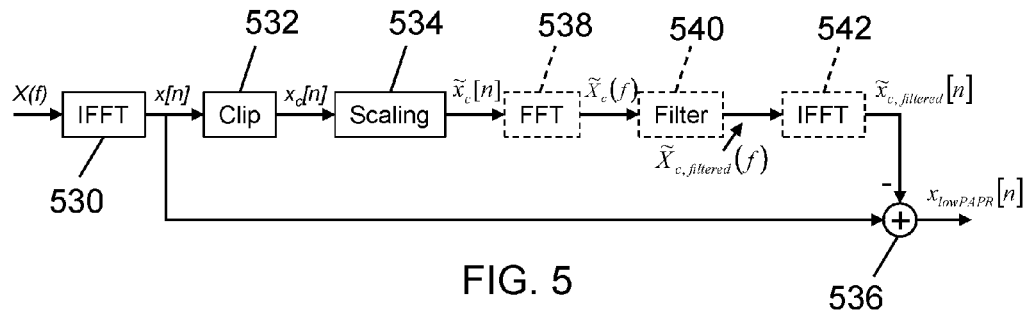
FIG. 5 shows an example embodiment of a signal processing circuit that can perform an improved clipping method.

FIG. 5 shows an example embodiment of a signal processing circuit that can perform an improved clipping method. The signal processing circuit may also be referred to as an OFDM-transmitter circuit because it is suitable for including in an OFDM transmitter. The signal processing circuit includes a clip-generation-block 532, a scaling-block 534 and an adder 536. As will be discussed below, these blocks can clip an input-signal in such a way that the PAPR is reduced, whilst generating less distortions than is the case with the circuit of FIG. 4.

The circuit of FIG. 5 also includes an optional FFT-block 538, filter 540 and IFFT-block 542 in order to remove out-of-band components from the clipped-signal in a similar way to that discussed above with reference to FIG. 4. This instance of an FFT-block 538 may be referred to as a clip-FFT-block, and it can have the same functionality as other FFT blocks described herein. Similarly, this instance of an IFFT-block 542 may be referred to as a clip-IFFT-block, and it can have the same functionality as other IFFT blocks described herein.

In this example, the circuit receives a frequency-domain-input-signal (X(f)), which is converted to a time-domain input-signal (x[n]) by an IFFT-block 530. This instance of an IFFT-block 422 may be referred to as an input-IFFT-block, and it can have the same functionality as other IFFT blocks described herein.

The clip-generation-block 532 receives the input-signal (x[n]) and determines a clip-signal ($x_c[n]$) that comprises only values of the input-signal (x[n]) that exceed a clipping-threshold (C). As discussed above, the clip-signal ($x_c[n]$) can be defined as:

$$x_c[n] = \begin{cases} x[n] - Ce^{j\phi_n}, & |x[n]| \geq C \\ 0, & |x[n]| < C \end{cases}$$

In this way the clip-signal comprises: zero values at instants in time for which the input-signal is less than the clipping-threshold; and non-zero values at instants in time for which the input-signal is greater than the clipping-threshold, wherein the magnitude of the non-zero values comprise the difference between the magnitude of the input-signal and the clipping-threshold.

The scaling-block 534 applies a scaling-factor to the clip-signal ($x_c[n]$) in order to generate a scaled-clip-signal ($\tilde{x}_c[n]$). In this example, the clip-signal ($x_c[n]$) is multiplied by the scaling-factor. The scaling-factor is greater than one such that the magnitude of the clip-signal ($x_c[n]$) that has non-zero components is increased. It will be appreciated that the clip-signal ($x_c[n]$) only has non-zero components at regions that correspond to portions of the input-signal (x[n]) that exceed the clipping-threshold (C).

In this example, the scaling-block 534 applies a time-domain-scaling-factor to the clip-signal ($x_c[n]$) in the time domain. As will be discussed below with reference to FIGS. 6 and 7, the scaling-factor can also be applied in the frequency domain.

The adder 536 can then provide a clipped-signal ($x_{lowPAPR}[n]$) based on a difference between the scaled-clip-signal ($\tilde{x}_c[n]$) and the input signal (x[n]). In this example, the clipped-signal ($x_{lowPAPR}[n]$) can be indirectly based on the scaled-clip-signal ($\tilde{x}_c[n]$) if the filter 540 is used to filter the scaled-clip-signal ($\tilde{x}_c[n]$). Similarly, in other examples, the clipped-signal ($x_{lowPAPR}[n]$) can be indirectly based on the input signal (x[n]) if the adder 536 receives the frequency-domain-input-signal (X(f)). Nonetheless, the adder 536 can still be said to provide the clipped-signal ($x_{lowPAPR}[n]$) based on the difference between the scaled-clip-signal ($\tilde{x}_c[n]$) and the input signal (x[n]).

In order to achieve a given PAPR reduction, the circuit of FIG. 5 can apply a higher clipping-threshold (C) than would be required by the circuit of FIG. 4. Advantageously this results in lower errors/distortions (for example a lower error vector magnitude (EVM)) because fewer peaks have been manipulated. Also, for a given level of errors, a reduced PAPR value can be achieved when compared with the circuit of FIG. 4. These improvements in performance are illustrated graphically in FIGS. 8 and 9, and will be described in more detail below.

Figure 6:
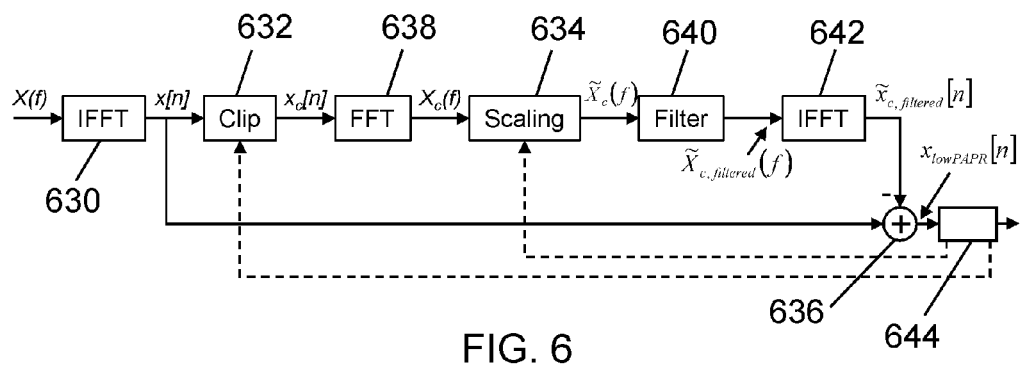
FIG. 6 shows another example embodiment of a signal processing circuit that can perform an improved clipping method.

FIG. 6 shows another example embodiment of a signal processing circuit that can perform an improved clipping method. Blocks of FIG. 6 that are similar to blocks of FIG. 5 have been given corresponding reference numbers in the 600 series and will not necessarily be described again here. In FIG. 6, the scaling of the clip-signal is performed in the frequency domain.

The clip-generation-block 632 receives an input-signal (x[n]) and determines a clip-signal ($x_c[n]$) in the same way as the corresponding block of FIG. 5. In this example, a FFT-block 638 converts the clip-signal ($x_c[n]$) to a frequency-domain-clip-signal ($X_c(f)$). This instance of a FFT-block 638 may be referred to as a clip-FFT-block, and it can have the same functionality as other FFT blocks described herein.

The scaling-block 634 then applies a frequency-domain-scaling-factor to the frequency-domain-clip-signal ($X_c(f)$) in order to generate the scaled-clip-signal ($\tilde{X}_c(f)$). In this example the frequency-domain-scaling-factor is referred to as a scaling-signal (S(f)) and the scaled-clip-signal ($\tilde{X}_c(f)$) is in the frequency domain.

The scaling signal (S(f)) can takes values in a predefined range, where at least some, and optionally all, of the values are greater than 1. In this way, the peaks in the clip-signal ($x_c[n]$) are clipped further, but no unnecessary small peaks are included in the clip-signal ($x_c[n]$). This is because, as discussed above, the clip-signal of FIG. 6 can have fewer peaks than the clip-signal of FIG. 4 due to the fact that a lower clipping-threshold can be used to achieve the same performance improvements. Scaling the clip-signal in this way can limit the distortion as well as regrowth in frequency bands outside of an allocated frequency band.

The scaling-block 634 generates the scaled-clip-signal ($\tilde{X}_c(f)$) as follows:

$$\tilde{X}_c(f) = S(f) \times X_c(f)$$

Note here that in this example the scaling-signal (S(f)) is real, while the frequency-domain-clip-signal ($X_c(f)$) and the scaled-clip-signal ($\tilde{X}_c(f)$) take complex values.

The values in the scaling-signal (S(f)) can be defined in different ways. For example, the scaling-signal (S(f)) can include constant values. If constant values are used, then the scaling can be considered as equivalent to the time-domain scaling that is described above with reference to FIG. 5. Alternatively, the scaling-signal (S(f)) can include randomly generated values. The random values may be limited to range of values, for example between a maximum-value and a minimum-value. The maximum-value may be greater than one, and the minimum-value may also be greater than one. If random values are used then a certain percentage of the subcarriers can be clipped less than others.

In one example, based on a baseband similar to 802.11a, the scaling-signal (S(f)) can define a function that includes randomly generated values between 1.6 and 2. This has been found to provide particularly good results for PAPR reduction.

The scaling-signal (S(f)) can also define a function that varies with frequency. For example, if there is a desire to preserve certain subcarriers more than others, or if certain subcarriers are less important, then the function can provide a required weighting to the scaling of the subcarriers. For example, a weighting for the subcarriers can be useful to take into account a known or estimated channel function.

The scaled-clip-signal ($\tilde{X}_c(f)$) is then processed by a filter 640. The filter 640 can remove or attenuate any out-of-band (OOB) terms in the scaled-clip-signal ($\tilde{X}_c(f)$). In this example, the filter 640 applies frequency-domain filtering to provide a scaled-filtered-clip-signal ($\tilde{X}_{c,filtered}(f)$). An IFFT-block 642 (which may be referred to as a clip-IFFT-block) converts the (frequency domain) scaled-filtered-clip-signal ($\tilde{X}_{c,filtered}(f)$) into a time domain signal: time-domain-scaled-filtered-clip-signal ($\tilde{x}_{c,filtered}[n]$).

The adder 636 then subtracts time-domain-scaled-filtered-clip-signal ($\tilde{x}_{c,filtered}[n]$) from the input-signal (x[n]) in order to provide the clipped-signal ($x_{lowPAPR}[n]$).

In some communication standards, OFDM modulation includes the use of pilot subcarriers. These subcarriers can have predefined values, and the OFDM signal at the transmitter should have these values at the given subcarriers. If the circuit of FIG. 6 is used to process OFDM signals with such pilot subcarriers, then the filter 640 (or a separate processing block that is not shown in the drawings) can attenuate the pilot-subcarriers in the scaled-filtered-clip-signal ($\tilde{X}_{c,filtered}(f)$), optionally by setting them to zero. This attenuating of the pilot-subcarriers can be performed as the last step in the frequency domain processing. That is, after a filtering operation that is performed by the filter 640 to attenuate OOB terms, and immediately before the IFFT block 642 (the clip-IFFT-block). In this way, the pilot values in the original frequency domain signal (X(f)) remain unchanged after the final subtraction by the adder 636.

That is, the filter 640 can attenuate (i) any out-of-band terms in the scaled-clip-signal $\tilde{X}_c(f)$; and/or (ii) any pilot-subcarriers in the scaled-clip-signal $\tilde{X}_c(f)$, in order to provide the scaled-filtered-clip-signal $\tilde{X}_{c,filtered}(f)$. Such a filter may be provided by one or more hardware processing blocks, or by one or more software processing modules. It will be appreciated that similar functionality can also be provided by the filters in other examples disclosed in this document.

FIG. 6 also shows an optional feedback-block 644, which provides a feedback loop to the clip-generation-block 632 and/or the scaling-block 634. The feedback-block 644 can determine the PAPR value and/or a distortion-measure of the clipped-signal ($x_{lowPAPR}[n]$), and then selectively provide a feedback-signal to the clip-generation-block 632 and/or the scaling-block 634 based on the PAPR value and/or the distortion-measure.

In accordance with the feedback-signal, the clip-generation-block 632 can apply an adjusted-clipping-threshold to the input-signal (x[n]), wherein the adjusted-clipping-threshold is different to a preceding-clipping-threshold. The preceding-clipping-threshold is the threshold-level that was applied in an earlier iteration of the feedback loop, optionally an immediately preceding iteration of the feedback loop. The preceding-clipping-threshold will be the (initial) clipping-threshold (C) following a first iteration of the feedback loop.

Similarly, in accordance with the feedback-signal, the scaling-block 634 can apply an adjusted-scaling-factor to the frequency-domain-clip-signal ($X_c(f)$), wherein the adjusted-scaling-factor is different to a preceding-scaling-factor. The preceding-scaling-factor is the scaling-factor that was applied in an earlier iteration of the feedback loop, optionally an immediately preceding iteration of the feedback loop.

For the second and each subsequent iteration of the feedback loop, the feedback-block 644 can determine/store one or more of the following:

the PAPR value of the clipped-signal ($x_{lowPAPR}[n]$), which is based on an input-signal clipped with the adjusted-clipping-threshold;

a distortion-measure of the clipped-signal ($x_{lowPAPR}[n]$), which is based on an input-signal clipped with the adjusted-clipping-threshold;

a preceding-PAPR-value, which is based on an input-signal clipped with the preceding-clipping-threshold; and a preceding-distortion-measure, which is based on an input-signal clipped with the preceding-clipping-threshold.

The feedback-block 644 can continue to cause additional iterations of the feedback loop to occur such that different clipping-thresholds are applied and/or different scaling-factors are applied until:

the PAPR value of the clipped-signal ($x_{lowPAPR}[n]$) reaches a target value;

the distortion-measure of the clipped-signal ($x_{lowPAPR}[n]$) reaches a target value;

a predefined number of iterations of the feedback loop have been performed;

a difference between the PAPR value of the clipped-signal (for a signal clipped with the adjusted-clipping-threshold) and a preceding-PAPR-value (for a signal clipped with the preceding-clipping-threshold) is reduced to a target value; or a difference between a current-distortion-measure (for a signal clipped with the adjusted-clipping-threshold) and a preceding-distortion-measure (for a signal clipped with the preceding-clipping-threshold) is reduced to a target value.

In some examples, the adjusted-clipping-threshold can be higher than the preceding-clipping-threshold. In which case, the feedback-block 644 can apply different clipping-thresholds until:

the PAPR value of the clipped-signal ($x_{lowPAPR}[n]$) exceeds a target value; or the distortion-measure of the clipped-signal ($x_{lowPAPR}[n]$) is lower than a target value.

Similarly, in some examples, the adjusted-clipping-threshold can be lower than the preceding-clipping-threshold. In which case, the feedback-block 644 can apply different clipping-thresholds until:

the PAPR value of the clipped-signal ($x_{lowPAPR}[n]$) is lower than a target value; or the distortion-measure of the clipped-signal ($x_{lowPAPR}[n]$) exceeds a target value.

In some examples, the adjusted-scaling-factor can be higher than the preceding-scaling-factor. In which case, the feedback-block 644 can apply different scaling-factors until:
- the PAPR value of the clipped-signal ($x_{lowPAPR}[n]$) is lower than a target value; or
- the distortion-measure of the clipped-signal ($x_{lowPAPR}[n]$) exceeds a target value.

Similarly, the adjusted-scaling-factor can be lower than the preceding-scaling-factor. In which case, the feedback-block 644 can apply different scaling-factors until:
- the PAPR value of the clipped-signal ($x_{lowPAPR}[n]$) exceeds a target value; or
- the distortion-measure of the clipped-signal ($x_{lowPAPR}[n]$) is lower than a target value.

Figure 7:
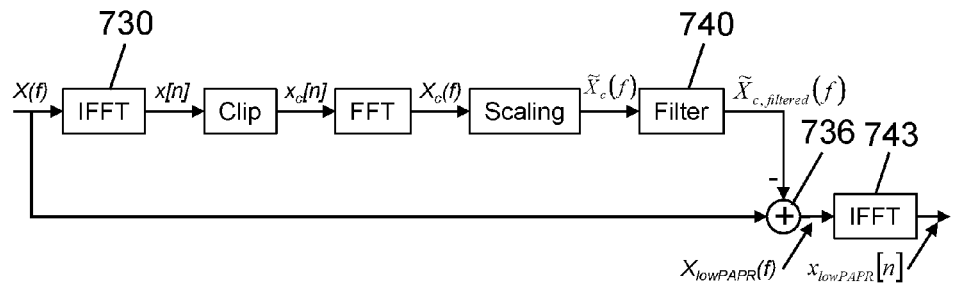
FIG. 7 shows a further example embodiment of a signal processing circuit that can perform an improved clipping method.

It will be appreciated that the circuits of FIGS. 5 and 7 can have similar feedback-blocks.

FIG. 7 shows a further example embodiment of a signal processing circuit that can perform an improved clipping method. Blocks of FIG. 7 that are similar to blocks of FIG. 6 have been given corresponding reference numbers in the 700 series and will not necessarily be described again here. In FIG. 7, the adder 736 subtracts the scaled-filtered-clip-signal ($\tilde{X}_{c,filtered}(f)$) from a frequency-domain representation of the input-signal (X(f)), and the resultant signal is then converted into the time domain for subsequent transmission.

In FIG. 7, the filter 740 provides the scaled-filtered-clip-signal ($\tilde{X}_{c,filtered}(f)$) directly to the adder 736 (instead of via a clip-IFFT-block, as in FIG. 6). The adder 736 also receives a frequency-domain representation of the input-signal (X(f)). In this example, the frequency-domain representation of the input-signal (X(f)) is received from the input terminal of an -IFFT-block 730 (which may be referred to as an input-IFFT-block). The output of the adder 736 in this example is a frequency-domain-clipped-signal ($X_{lowPAPR}(f)$).

The circuit of FIG. 7 includes an IFFT-block 743 that converts the frequency-domain-clipped-signal ($X_{lowPAPR}(f)$) into a time-domain signal: clipped-signal ($x_{lowPAPR}[n]$). This instance of an IFFT-block 743 may be referred to as a clipped-IFFT-block.

Advantageously, use of the circuits of any one of FIGS. 5 to 7 in an OFDM transmitter does not require any change to the functionality of a corresponding OFDM receiver.

Figure 8:
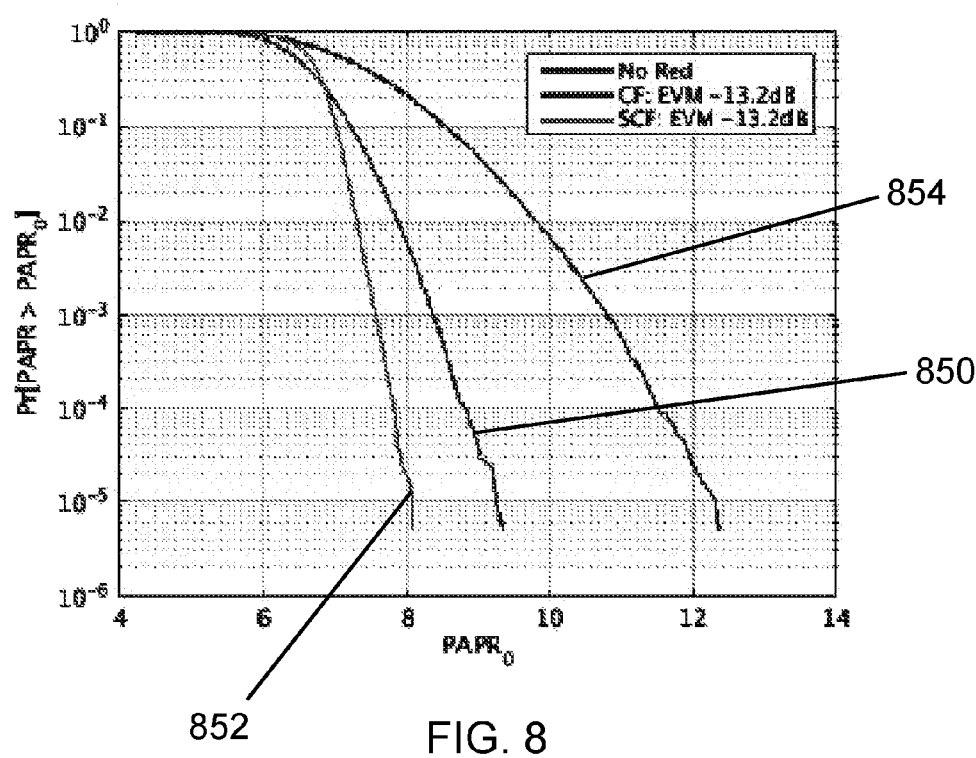
FIGS. 8 and 9 illustrate graphically the performance of various circuits.
Figure 9:
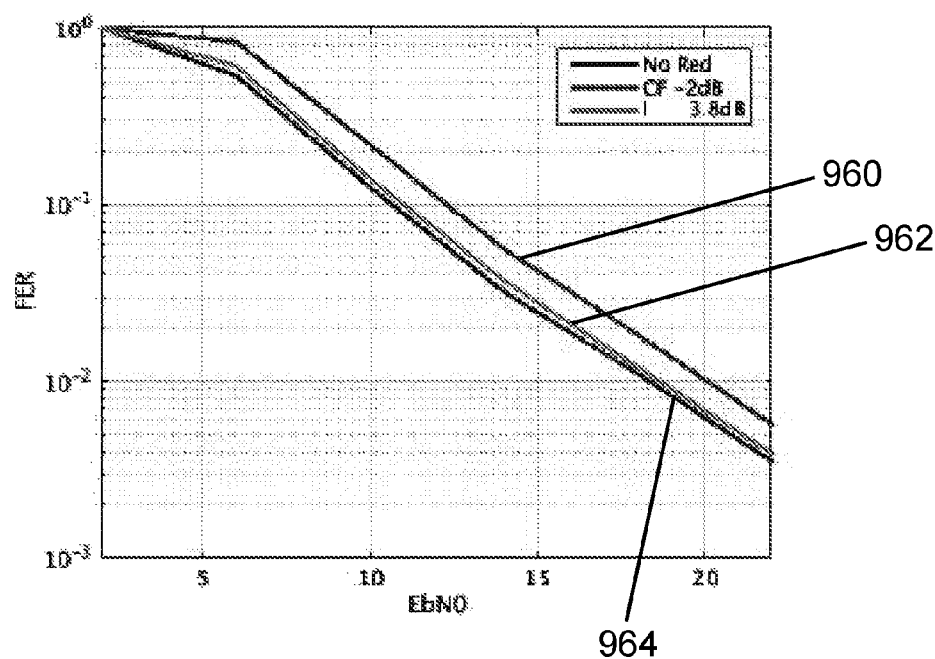

FIGS. 8 and 9 illustrate graphically the performance of:
- a signal processing circuit that performs the clipping and filtering method of FIG. 4 (without scaling);
- a signal processing circuit that performs a clipping and filtering method of one of FIGS. 5 to 7 (with scaling); and
- a signal processing circuit that does not perform any clipping and filtering at all.

FIG. 8 shows graphically a complementary cumulative distributive function (CCDF) of PAPR values for each of the circuits, in a similar way to the graph of FIG. 2.

In FIG. 8:
- the performance of the circuit of FIG. 4, with a clipping-threshold that results in an EVM value of −13.2 dB is shown with reference 850;

- the performance of the circuit of one of FIGS. 5 to 7 (with scaling), with a clipping-threshold that results in an EVM value of −13.2 dB is shown with reference 852; and
- the performance of a circuit with no clipping and filtering is shown with reference 854.

FIG. 8 shows that, for a given EVM value, the circuit of one of FIGS. 5 to 7 provides a lower, improved PAPR value when compared with the circuit of FIG. 4 and also when compared with a circuit that has no clipping and filtering.

In FIG. 9, the vertical axis represents frame/bit error rate, and the horizontal axis represents a level of noise that is added to the OFDM signal by the channel. In this way, the horizontal axis represent a ratio in dB between the energy per bit and the noise that is added to the OFDM signal. Furthermore, in FIG. 9 the channel is a fading channel; not only a channel with AWGN (additive white Gaussian noise).

In FIG. 9:
- the performance of the circuit of FIG. 4, with a clipping-threshold that results in a predetermined PAPR value, is shown with reference 960;
- the performance of the circuit of one of FIGS. 5 to 7 (with scaling), with a clipping-threshold that results in the same predetermined PAPR value, is shown with reference 962; and
- the performance of a circuit with no clipping and filtering is shown with reference 964.

FIG. 9 shows that, for a given PAPR value, the circuit of one of FIGS. 5 to 7 provides a lower, improved error rate when compared with the circuit of FIG. 4. Also, the error rate of the circuit one of FIGS. 5 to 7 has an only marginally worse error rate when compared with a circuit that has no clipping and filtering.

The below table provides a further illustration of the improved performance that can be achieved by the circuits of FIGS. 5 to 7. PAPR values at $10^{-4}$ CCDF are shown for a plurality of signal processing circuits, along with EVM values at the transmitter for different clipping-threshold levels/factors.

In this table, the degree of clipping applied by the circuits is stated as a clipping ratio in dB. The clipping ratio is defined as:

$$CR = 20 \log_{10}\left(\frac{C}{\sqrt{P_{avg}}}\right)$$

Where C is the clipping threshold, and $P_{avg}$ is the average power of the signal.

|  | No Red | CF 6 dB | SCF 8.045 dB | CF 2 dB | SCF 5.6 dB | CF −2 dB | SCF 3.8 dB |
|---|---|---|---|---|---|---|---|
| EVM | −∞ | −15.2 | −19.2 | −7.9 | −11.9 | −4.3 | −8.3 |
| PAPR at $10^{-4}$ | 11.6 | 9.2 | 9.2 | 7.5 | 7.5 | 7 | 6.9 |
| Average Power | 0.203 | 0.199 | 0.203 | 0.164 | 0.196 | 0.101 | 0.178 |

In the above table:
- "No red" represents a circuit for which no reduction by clipping and filtering is performed;
- "CF xdB" represents the circuit of FIG. 4 that applies clipping and filtering (CF), with a clipping-ratio set at xdB; and "SCF xdB" represents the circuit of FIGS. 5 to 7 that applies clipping, filtering and scaling, with a clipping-ratio set at xdB.

The data in the table indicates that the circuit of FIGS. 5 to 7 provides improved performance when compared with the circuit of FIG. 4 for a plurality of clipping-ratios, both in terms of a reduction of PAPR for a similar EVM value, and a reduction in EVM for a given PAPR value.

More particularly, a comparison between the circuit of FIG. 4 (CF) and the circuits of FIGS. 5 to 7 (SCF) show that the circuits of FIGS. 5 to 7 are superior:

At same PAPR reduction, EVM is 4 dB lower for SCF.

FER doesn't show significant difference at high CR (clipping ratio).

At low CR (4.6 dB PAPR reduction) the circuits of FIGS. 5 to 7 achieve about 1.2 dB reduction in SNR for the same FER.

To meet an EVM requirement of −13 dB, CF can achieve up to 2.9 dB PAPR reduction SCF can achieve 3.8 dB PAPR reduction SCF can achieve 4.6 dB PAPR reduction with no significant increase in FER and an EVM of −8.3 dB.

It will be appreciated from the above description that the circuits of FIGS. 5 to 7 relate to a change to the clipping strategy of FIG. 4, and can limit the EVM value while achieving a similar PAPR reduction. In this way, the signal that is to be transmitted can be clipped in such a way that the impact of PAPR reduction on EVM can be minimized/reduced.

One or more of the circuits disclosed herein can be provided in a user terminal for all communication and networking standards based on OFDM, such as 802.11a/g/n/ac/p, LTE, LTE-A. The circuits/methods can also be applied to OFDM-based proprietary standards.

The instructions and/or flowchart steps in the above figures can be executed in any order, unless a specific order is explicitly stated. Also, those skilled in the art will recognize that while one example set of instructions/method has been discussed, the material in this specification can be combined in a variety of ways to yield other examples as well, and are to be understood within a context provided by this detailed description.

In some example embodiments the set of instructions/method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums. Such computer-readable or computer usable storage medium or media is (are) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

It will be appreciated that any components said to be coupled may be coupled or connected either directly or indirectly. In the case of indirect coupling, additional components may be located between the two components that are said to be coupled.

In this specification, example embodiments have been presented in terms of a selected set of details. However, a person of ordinary skill in the art would understand that many other example embodiments may be practiced which include a different selected set of these details. It is intended that the following claims cover all possible example embodiments.

The invention claimed is:

1. A signal processing circuit comprising:
a clip-generation-block configured to:
receive an input-signal; and
determine a clip-signal that comprises only values of the input-signal that exceed a clipping-threshold;
a scaling-block configured to apply a scaling-factor to the clip-signal in order to generate a scaled-clip-signal, wherein the scaling-factor is greater than one, wherein the clipping-threshold is determined based on a feedback signal from the scaling-block; and
an adder configured to provide a clipped-signal based on a difference between the scaled-clip-signal and the input signal.

2. The signal processing circuit of claim 1, wherein the scaling-factor comprises a frequency-domain-scaling-factor, which defines a function that varies with frequency.

3. The signal processing circuit of claim 2, wherein the frequency-domain-scaling-factor comprises a plurality of randomly generated values that are limited to range of values between a maximum-value and a minimum-value.

4. The signal processing circuit of claim 1, wherein the scaling-factor comprises a time-domain-scaling-factor.

5. The signal processing circuit of claim 1, wherein the clip-signal comprises:
zero values at instants in time for which the input-signal is less than the clipping-threshold; and
non-zero values at instants in time for which the input-signal is greater than the clipping-threshold.

6. The signal processing circuit of claim 5, wherein the non-zero values comprise the difference between the input-signal and the clipping-threshold.

7. The signal processing circuit of claim 1, wherein the scaling-block is configured to multiply the clip-signal by the scaling-factor in order to generate the scaled-clip-signal.

8. The signal processing circuit of claim 1, further comprising a filter, wherein the filter is configured to attenuate (i)

any out-of-band terms in the scaled-clip-signal; and/or (ii) any pilot-subcarriers in the scaled-clip-signal, in order to provide a scaled-filtered-clip-signal; and wherein the adder is configured to provide the clipped-signal based on a difference between the scaled-filtered-clip-signal and the input-signal.

9. The signal processing circuit of claim 1, further comprising a feedback-block, which provides a feedback loop to the clip-generation-block and/or the scaling-block, wherein the feedback-block is configured to:

determine a PAPR (peak-to-average power ratio) value and/or a distortion-measure of the clipped-signal; and selectively provide a feedback-signal to the clip-generation-block and/or the scaling-block based on the PAPR value and/or the distortion-measure; and wherein the clip-generation-block is configured to apply an adjusted-clipping-threshold to the input-signal based on the feedback-signal and/or the scaling-block is configured to apply an adjusted-scaling-factor to the clip-signal based on the feedback-signal.

10. The signal processing circuit of claim 9, wherein the feedback-block is configured to cause additional iterations of the feedback loop to occur such that different clipping-thresholds and/or different scaling-factors are applied until:

the PAPR value of the clipped-signal reaches a target value;

the distortion-measure of the clipped-signal reaches a target value; or a predefined number of iterations of the feedback loop have been performed.

11. The signal processing circuit of claim 9, wherein the feedback-block is configured to, for a second and each subsequent iteration of the feedback loop, determine one or more of the following:

the PAPR value of the clipped-signal, which is based on an input-signal clipped with the adjusted-clipping-threshold;

the distortion-measure of the clipped-signal, which is based on an input-signal clipped with the adjusted-clipping-threshold;

a preceding-PAPR-value, which is based on an input-signal clipped with a preceding-clipping-threshold in an earlier iteration of the feedback loop; and a preceding-distortion-measure, which is based on an input-signal clipped with a preceding-clipping-threshold in an earlier iteration of the feedback loop.

12. The signal processing circuit of claim 11, wherein the feedback-block is configured to cause additional iterations of the feedback loop to occur such that different clipping-thresholds are applied and/or different scaling-factors are applied are applied until:

a difference between the PAPR value of the clipped-signal and a preceding-PAPR-value is reduced to a target value; or a difference between a current-distortion-measure and a preceding-distortion-measure is reduced to a target value.

13. An OFDM transmitter comprising the signal processing circuit of claim 1.

14. A method of processing an input-signal, the method comprising:

determining a clip-signal that comprises only values of the input-signal that exceed a clipping-threshold;

applying a scaling-factor to the clip-signal in order to generate a scaled-clip-signal, wherein the scaling-factor is greater than one wherein the clipping-threshold is determined based on a feedback signal from the scaling-block; and providing a clipped-signal based on a difference between the scaled-clip-signal and the input signal.

15. A non-transitory computer readable media including programming instructions, which when run on by a processor of a computer, causes the computer to perform the method of claim 14.

* * * * *